United States Patent [19]

Elliott et al.

[11] Patent Number: 4,521,590
[45] Date of Patent: Jun. 4, 1985

[54] PARTICLE FORM EVAPORATION OF POLYMER-LIQUID MIXTURES

[75] Inventors: Richard E. Elliott; William R. King, both of Bartlesville, Okla.

[73] Assignee: Phillips Petroleum Company, Bartlesville, Okla.

[21] Appl. No.: 427,220

[22] Filed: Sep. 29, 1982

[51] Int. Cl.³ ............................. C08F 6/14; C08F 6.06
[52] U.S. Cl. ..................................... 528/502; 34/10; 159/DIG. 10; 528/503
[58] Field of Search ...................... 528/502, 503, 480; 159/44; 34/10, 12

[56] References Cited

U.S. PATENT DOCUMENTS 4,263,091  4/1981  King ................................... 159/44
4,310,973  1/1982  King ..................................... 34/10

Primary Examiner—Christopher A. Henderson

[57] ABSTRACT

A polymer is dried by introducing a mixture of polymer and liquid into an agitated bed of hot polymer particles.

18 Claims, 4 Drawing Figures

PARTICLE FORM EVAPORATION OF POLYMER-LIQUID MIXTURES This invention relates to particle form evaporation. In one aspect this invention relates to the drying of a polymer. In another aspect this invention relates to improved polymerization processes.

BACKGROUND—POLYMER SOLUTIONS AND PARTICLE FORM EVAPORATION

W. R. King (co-inventor of this invention) has developed and used a process for the recovery of rubbery polymer from a solution comprising a hydrocarbon solvent (e.g. cyclohexane) having the polymer dissolved therein. This process, called particle form evaporation, involves introducing a polymer solution into a bed of agitated polymer particles. Typically, the introduction of polymer solution is accomplished by spraying the polymer solution into the bed. The spraying of the solution generally results in the flashing of a large portion of the solvent. Agitation of the polymer particle bed produces heat which causes further evaporation of solvent. Evaporation can be facilitated by passing a hot inert gas such as, for example, $N_2$ through the agitated polymer particle bed. A better and more complete understanding of particle form evaporation and this invention can be obtained by reference to U.S. Pat. Nos. 4,310,973 and 4,263,091 and to the two copending applications filed on the same day as this application. W. R. King is the inventor named in both applications. The above-identified patents are incorporated by reference.

Our efforts have been directed towards the discovery of new uses for the particle form evaporation process. This disclosure presents some of the fruits of that labor.

BACKGROUND—POLYMERIZATION METHODS

Some of the polymerization methods commonly employed are (1) bulk polymerization, (2) solution polymerization, (3) suspension polymerization, and (4) emulsion polymerization. These methods are briefly described below.

Bulk polymerization can be described as a process wherein liquid or gaseous monomer is subjected to polymerization conditions in the presence of no more than an initiating substance. Heat, ultraviolet light or high-energy radiation can be used to facilitate polymerization. The absence of other materials or substances distinguishes this method from the others.

Solution polymerization involves conducting the polymerization in the presence of a solvent capable of dissolving the monomer. In many applications the solvent is also capable of dissolving the polymer produced by the polymerization. In such a case the end product of the polymerization is a polymer solution. If the solvent is not capable of dissolving, or substantially dissolving, the polymer then the end product is a polymer slurry.

Suspension polymerization employs a dispersion medium (usually aqueous) in which the monomer is insoluble. Introduction of the monomer into such a medium results in the formation of monomer droplets. In practice protective colloids are typically added to help stabilize the dispersion. Polymerization proceeds within the monomer droplets such that the process can be described as micro-bulk polymerization.

Emulsion polymerization is also conducted in a dispersion medium (usually aqueous) in which the monomer is insoluble or sparingly soluble. Typically a soap-like micelle-generating substance and a water-soluble initiator are present in the medium. The immediate product produced by this process is in the form of a polymer-containing latex.

The above-described polymerization processes are well known in the art. For a better and more complete description of these processes the reader is advised to consult *Emulsion Polymerization Theory and Practice*, D. C. Blackley, Applied Science Publishers Ltd., London (see especially pages 1–23) and *Emulsion Polymerization*, F. A. Bovey, I. M. Kolthoff, A. I. Medalia and E. J. Meehan, Interscience Publishers, Inc., New York (see especially pages 12–21).

After solution polymerization the polymer must be recovered from the polymer solution or polymer slurry. After suspension polymerization the polymer must be separated from the dispersion medium. Similarly, after emulsion polymerization the polymer must be separated from the latex. As described earlier the polymer can be recovered from the polymer solution through the particle form evaporation process. One aspect of our invention is directed towards the recovery of polymer from a polymer-containing slurry, dispersion medium or latex.

SUMMARY OF OUR INVENTION

A mixture comprising a liquid and a polymer not substantially dissolved in the liquid is introduced into an agitated bed of hot polymer particles to effect substantial evaporation of the liquid from the polymer. For example, polymer can be recovered from a polymer-containing slurry, dispersion medium or latex by introducing the polymer-containing slurry, dispersion medium or latex into an agitated bed of hot polymer particles. In another example of our invention a polymer-containing slurry, dispersion medium or latex is processed to effect removal of a liquid medium (e.g. water, solvent, diluent, etc.) to produce a wet polymer which is further dried by introduction of the wet polymer into an agitated bed of hot polymer particles.

OBJECTS OF THE INVENTION

Figure 1:
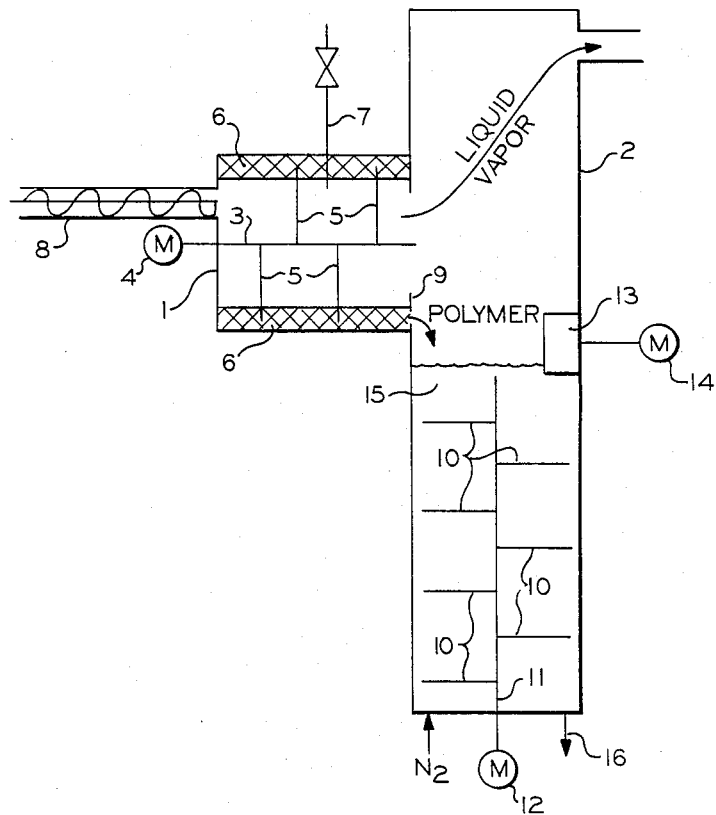
FIG. 1 depicts a particle form evaporator in combination with a stripper column.

It is an object of this invention to dry a polymer.

It is another object of this invention to provide improved polymer recovery processes.

These objects and other objects and advantages will be apparent to a person of ordinary skill in the art upon a study of this disclosure and the appended claims.

DETAILED DESCRIPTION

In accordance with our invention a mixture comprising a liquid and a polymer not substantially dissolved in the liquid is introduced into an agitated bed of polymer particles to effect substantial evaporation of the liquid from the polymer. The particle form evaporation processes and apparatus as described in U.S. Pat. Nos. 4,310,973 and 4,263,091 and in the previously-identified patent applications can be adapted to this purpose.

The mixture can be, for example, any one of the following: a latex produced in an emulsion polymerization process; a polymer suspended in an aqueous environment or other liquid; a polymer slurry; or simply a wet polymer. The above represent only a few of the polymer-liquid mixtures which fall within the scope of our invention. The weight percentage ratio of polymer to liquid in the mixture can range from extremely small to extremely large.

The polymer-liquid mixture can be introduced into the agitated polymer bed in most any manner. For example the mixture can be sprayed into the bed or mixed with fillers to form a paste which is extruded into the bed.

The polymer of which the mixture is partially comprised can be any homopolymer, copolymer, terpolymer or the like or any blend thereof although it is contemplated that organic polymers are generally best suited for our invention. By way of non-limiting example, the mixture can be a polymer slurry, the polymer of which is an ethylene-propylene copolymer, an ethylene-propylene-bornylene terpolymer, an ethylene-propylene-ethylidene terpolymer, or a polymer derived from any combination of ethylene, propylene, bornylene or ethylidene monomers. Another example of the mixture can be represented by a latex containing a butadiene-styrene copolymer. Yet another example is a mixture containing a polymer at least partially derived from a vinyl compound monomer. A vinyl compound is defined to be a compound having the vinyl group ($CH_2=CH-$). Examples of vinyl compounds include vinyl chloride, vinyl acetate, styrene, methyl methacrylate and acrylonitrile.

The polymer of which the polymer particle bed is comprised can be any homopolymer, copolymer, terpolymer or the like or any blend thereof although it is likewise contemplated that organic polymers are generally best suited for our invention. The polymer in the mixture and the polymer in the bed can be of the same polymer type. For example, a mixture comprising a butadiene-styrene copolymer and a liquid can be introduced into an agitated bed of butadiene-styrene copolymer particles. It is preferred that the particles in the bed be derived or formed from the polymer that is fed into the bed. This is advantageous because it not only obviates the need for a second source of polymer but assures a fresh and constantly changing particle bed. Furthermore it is the simplest and most practicable approach.

The polymer particle bed can be contained in a vessel. The vessel can be, for example, cylindrically shaped. The axis of rotation of such a cylindrically-shaped vessel can be vertically, horizontally or otherwise oriented.

The vessel should be used in combination with a means for mechanically agitating the polymer particle bed. A mechanical agitation means positioned within the vessel is suitable. For example, a rotating shaft with mixing blades attached thereto can provide satisfactory agitation of the bed. The term blade is intended to be broadly construed and includes, for example, paddles, rods, pins, etc.

To facilitate evaporation a hot gas (preferably inert) can be passed through the polymer particle bed and/or a hot fluid can be passed through a heating jacket positioned around the vessel.

Although wide variation is possible and within the scope of our invention we recommend operating the particle form evaporator at a bed temperature below the temperature at which significant thermal degradation of the polymer will occur and with a bed residence time of about 1 to about 30 minutes. Good drying results are obtained by keeping the temperature above about the boiling point of the liquid.

Fillers can be added to the particle form evaporator to facilitate the creation and maintenance of a polymer particle bed. The teaching of the related copending application to King, filed on the same day as this application, can be readily adapted to this invention.

Examples of suitable fillers include silica, sand, various forms of calcium carbonate (such as limestone, diatomaceous earth and chalk), clay, hydrated aluminum silicate, magnesium silicate, kaolin, feldspar, mica, aluminum hydroxide, ZnO, ZnS, $TiO_2$, $BaSO_4$, barytes, asbestos, cotton, jute, wood, nylon, wool and glass. The list can be expanded to include any of the carbon blacks and amorphous or crystalline graphite. Suitable fillers also include polymers which include, by way of non-limiting example, the polystyrene polymers whether homopolymer, copolymer, terpolymer, etc. or blends thereof. A specific example that is well suited for this purpose is α-methyl polystyrene.

The fillers can either be added to the polymer-liquid mixture before introduction of the mixture into the particle form evaporator or introduced to the particle form evaporator separate from the mixture. It is of course possible to introduce a portion of the fillers with the mixture and to introduce the remaining portion of the fillers separately into the same bed.

In accordance with one method for practicing our invention the polymer-liquid mixture and fillers are combined to form a paste prior to introducing the mixture and fillers into the particle form evaporator. To facilitate formation and processing of the paste an oil such as one of the naphthenic, aromatic or paraffinic extender oils can be added. Additional solvent can also be added if desired. By using a paste to introduce the polymer and fillers into the bed the concomitant introduction of air into the particle form evaporator is substantially eliminated.

FIG. 1 illustrates one embodiment of our invention. A cylindrically shaped horizontally oriented particle form evaporator vessel 1 is in open communication with a stripper column 2. A shaft 3 is rotated by a motor 4. Blades 5 attached to the rotated shaft 3 mechanically agitate a bed of polymer particles 6. The polymer-liquid mixture can be introduced into the vessel 1 by a conduit means 7 or an extrusion means 8. The choice of introduction means will depend in part on the fluidity of the polymer-liquid mixture. For some mixtures it may be desirable to provide the end of conduit 7 with a means (such as a nozzle) to spray the mixture into vessel 1 and bed 6. Spraying, when practicable, facilitates flashing of the liquid as it enters the vessel 1.

The rotating blades 5 drive the polymer to the wall of the cylindrically-shaped vessel 1 where the polymer particle bed 6 forms. The beating action of the rotating blades promotes formation of the polymer into the desired particles. The polymer particle bed provides resistance to the rotation of the blades. This resistance to mechanical agitation results in the input of heat into the bed.

A slide gate 9 controls the amount of polymer which leaves the vessel 1 and falls into the stripper column 2. The slide gate 9 is preferably operated in response to the accumulation of polymer in the bed 6. The purpose of the stripper column is to channel away evaporated liquid from the particle form evaporator vessel 1 and to evaporate the last traces of liquid remaining in the polymer particles. Note that $N_2$ (or other inert gas) is passed through the column. Polymer in the stripper column 2 is agitated by mixing blades 10 attached to shaft 11 which is rotated by motor 12. A grinder 13, operated by motor 14, reduces the size of the larger polymer particles which tend to accumulate near the surface of the polymer bed 15 in the stripper column 2. Ground polymer is thrown upwards from the grinder to facilitate evaporation of trace amounts of liquid. The dried polymer is removed at 16.

Figure 2:
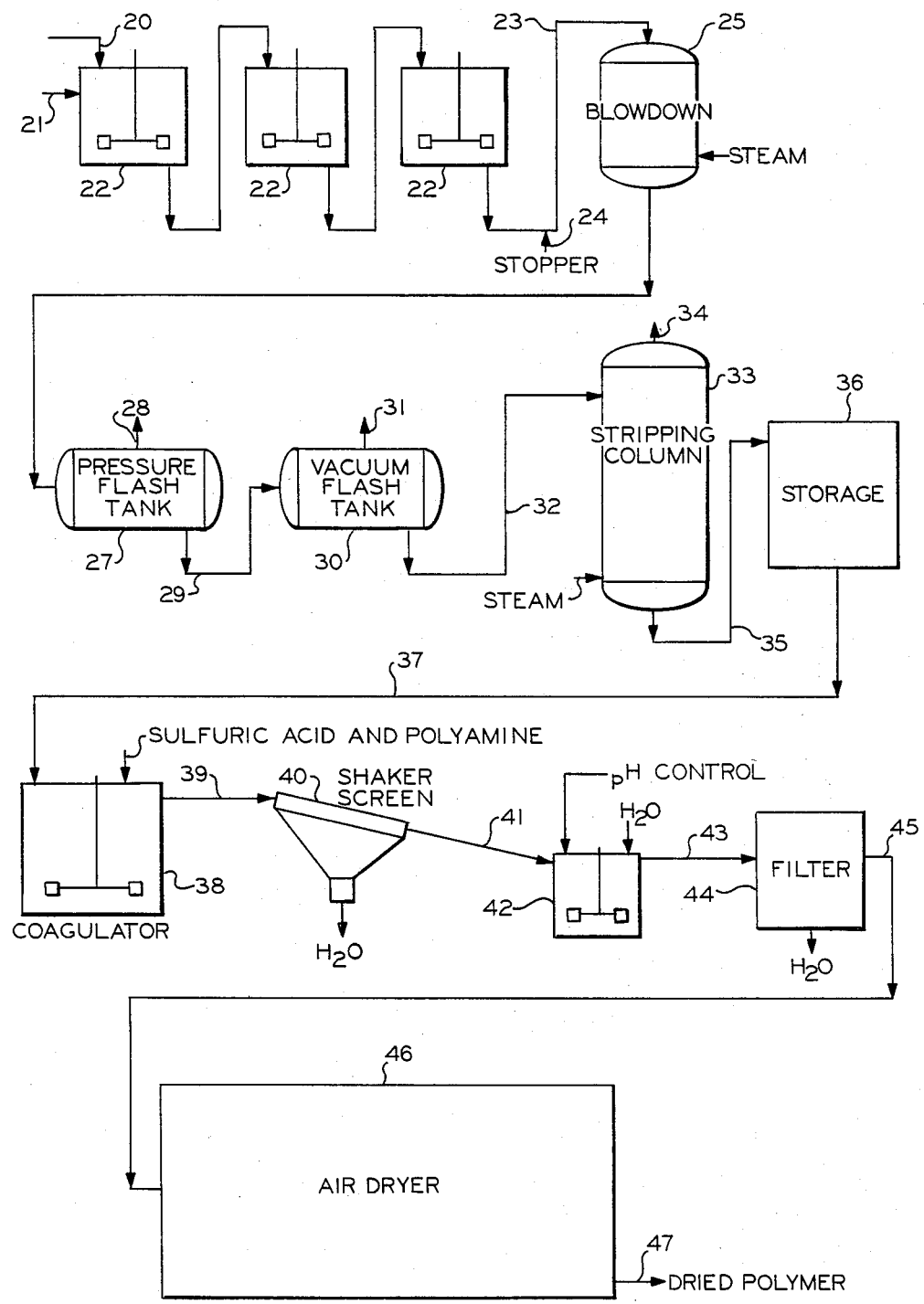
FIG. 2 depicts an emulsion polymerization and recovery process.

FIG. 2 depicts an emulsion polymerization process well known in the art. The process will be described in terms of styrene-butadiene copolymer production although the process is generally suitable for the production of many other polymers which include, by way of nonlimiting example, rubbery homopolymers of conjugated dienes such as isoprene, 1,3-butadiene, 2,3-dimethyl-1,3-butadiene, 1,3-hexadiene and the like and rubbery copolymers of these and other conjugated dienes and comonomers selected from, for example, styrene, acrylonitrile, methylacrylate, methylmethacrylate, vinyl chloride, ethylene, propylene, 1-butene, 1-octene and the like.

Typical recipes for preparing "hot" and "cold" styrene-butadiene copolymer (SBR) are shown in Table I below.

TABLE I

Typical Recipes for Preparing "Hot" and "Cold" SBR

| | Weight by parts | |
|---|---|---|
| | SBR 1000$^a$ ("Hot") | SBR 1500$^a$ ("Cold") |
| Butadiene | 75 | 72 |
| Styrene | 25 | 28 |
| Water | 180 | 180 |
| Fatty acid soap$^b$ | 4.5 | 4.5 |
| KCl | — | 0.3 |
| Auxiliary surface active agent | — | 0.3 |
| t-Dodecyl mercaptan | 0.28 | 0.20 |
| $K_2S_2O_8$ | 0.3 | — |
| p-Menthane hydroperoxide | — | 0.063 |
| $FeSO_4.7H_2O$ | — | 0.010 |
| Ethylenediamine tetraacetic acid salt | — | 0.050 |
| Sodium formaldehyde sulfoxylate | — | 0.050 |
| Temperature of polymerization, °C. | 50 | 5 |
| Conversion, % | 72 | 60 |
| Polymerization stopper | HQ$^c$ | DMDT$^c$ |
| Antioxidant | BLE$^c$ | BLE$^c$ |

$^a$These numbers are designations for types of rubber given by an IISRP committee.
$^b$Fatty acid soaps are used alone and in mixtures with rosin soaps.
$^c$HQ = hydroquinone, DMDT = N,N—dimethyldithiocarbamate, BLE = diphenylamine-acetone condensation product.

The above table was originally presented in *Polymer Chemistry of Synthetic Elastomers* Part I, Chapter 4A, "Butadiene-Styrene Rubbers (SBR) and Rubbers from Substituted Butadienes and Styrenes" by Carl A. Uraneck, published by Interscience Publishers, a division of John Wiley and Sons, New York (see page 133). Pages 123 to 183 provide a detailed description of the relevant chemistry and should be consulted if such information is desired. The above-identified pages are incorporated by reference herein.

In the description that immediately follows a "cold" temperature (i.e. about 5° C.) of polymerization will be assumed. It should be noted, however, that the scope of this invention is not limited thereto.

Referring to FIG. 2, streams 20 and 21 are introduced in a continuous manner into the first of a series of stirred reactors 22. Stream 20 is formed by mixing and cooling in a pre-cooler tank (not shown in FIG. 2) the following:
 (1) Butadiene monomer
 (2) Styrene monomer
 (3) Soap solution
   —Fatty acid soap
   —KCl
   —Auxiliary surfactant
   —Water
 (4) Water
 (5) t-Dodecyl mercaptan
 (6) p-Menthane hydroperoxide.

Stream 21 is a mixture consisting of the following:
 (1) Water
 (2) $FeSO_4.7H_2O$
 (3) Ethylenediamine tetraacetic acid salt
 (4) Sodium formaldehyde sulfoxylate.

It should be noted that while only 3 reactors 22 are shown typically a series of 8 to 12 such reactors are used in commercial operations.

A polymer-containing latex is withdrawn through line 23 from the last of the reactors 22. A polymerization stopper, N,N-dimethyldithiocarbamate (DMDT), is combined with the latex at 24. The latex continues along 23 and into a blowdown vessel 25. Steam is used to heat the latex up to a temperature of about 100° to 115° F. and a pressure of about 40 psig to prepare the latex for recovery of unreacted monomer.

The latex is passed through line 26 to a pressure flash tank 27 where pressure is reduced to about 3 to 5 psig and where unreacted butadiene monomer and some water are removed overhead at 28. The latex is passed to a vacuum flash tank where pressure is further reduced to about 200 millimeters and where more unreacted butadiene monomer, some unreacted styrene monomer and some water are removed overhead at 31. The latex is passed through line 32 to the upper portion of a stripping column 33. Unreacted styrene monomer and water are removed overhead at 34. The latex is passed through line 35 to a storage facility 36.

When desired the polymer-containing latex is passed from storage through line 37 to a stirred vessel 38 called the coagulator. Sulfuric acid and a polyamine (a multifunctional amine) are introduced into the coagulator to convert the soap to the fatty acid. The overflow from the coagulator is directed along 39 and onto a shaker screen 40 for removal of water. The polymer is then passed along 41 to a stirred vessel 42 for a water wash. The pH in the water wash is adjusted to about 4 by addition of a caustic or acid pH control as necessary.

The overflow from the stirred vessel 42 is directed along 43 to a filter 44 for removal of water. The wet polymer is passed through line 45 to an air dryer 46 from which dried polymer is removed at 47.

In one embodiment of our invention the wet polymer in line 45 is passed, not to an air dryer, but to the apparatus depicted in FIG. 1 or, more broadly, to any of the particle form evaporators of this invention. The particle form evaporator will produce the desired dry polymer.

Figure 3:
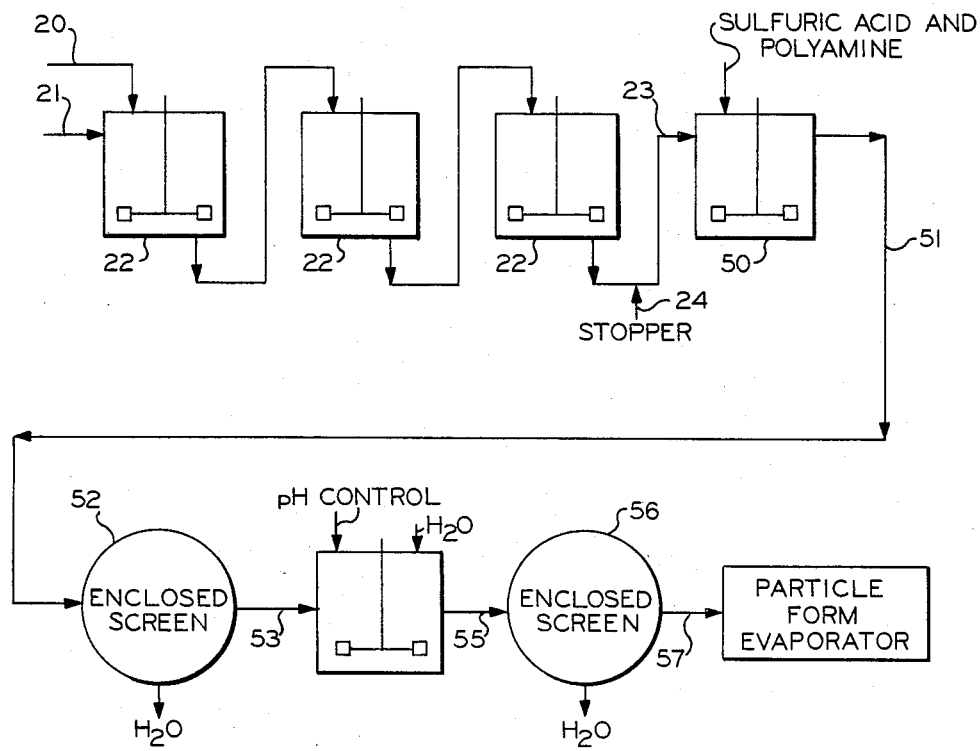
FIG. 3 depicts an emulsion polymerization and improved recovery process.

In another embodiment of our invention the emulsion polymerization process is simplified as shown in FIG. 3. Streams 20 and 21, as described above, are introduced into a series of stirred reactors 22. A polymer-containing latex is withdrawn from the last of the reactors 22 through line 23. The polymerization stopper is added at 24. The latex is then passed to an enclosed coagulator 50—enclosed meaning that the unreacted butadiene and styrene monomers are unable to escape directly to the atmosphere. Means are provided elsewhere (see FIG. 4) for vapor recovery. Wet polymer crumb is passed from the coagulator 50 through line 51 to an enclosed screen 52 for removal of water. The polymer crumb is passed through line 53 to an enclosed water wash 54. The washed polymer crumb is passed through line 55 to a second enclosed screen 56 for water removal. The polymer-crumb is introduced via line 57 into a particle form evaporator such as, for example, the apparatus of FIG. 1, to remove unreacted butadiene monomer and unreacted styrene monomer and to evaporate the remaining water and any other liquid material. A dried polymer (i.e. styrene-butadiene copolymer) results.

Figure 4:
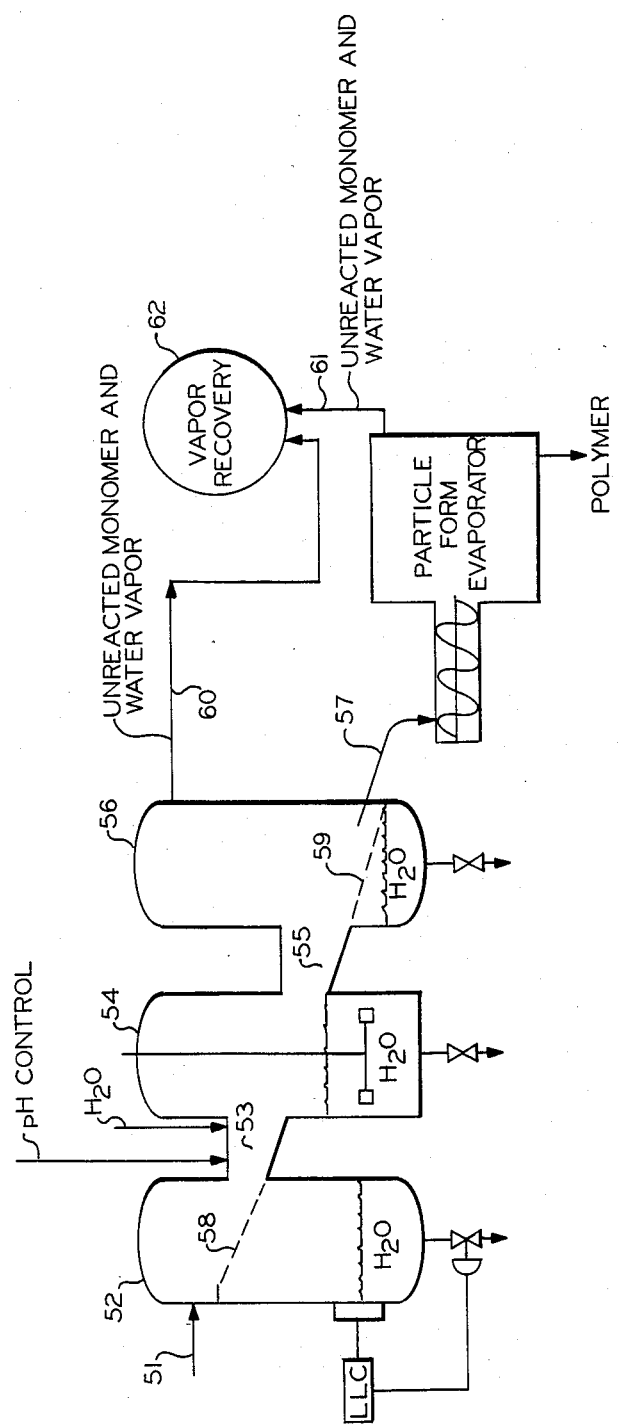
FIG. 4 depicts the improved recovery process shown in FIG. 3 in greater detail.

The last portion of the process of FIG. 3 is shown in greater detail in FIG. 4. The screens 58 and 59 can be vibrating screens to facilitate the screening action. Unreacted monomer and water vapor are removed through 60 and 61 and passed to a vapor recovery system 62. The vapor recovery system can be one or more condensers. Recovered monomer is available for recycle.

If in the process of FIG. 3 and FIG. 4 the wet polymer crumb produced in the coagulator 50 becomes too "sticky" to allow transfer to the enclosed screen 52 the conversion of monomer to polymer in the reactors 22 should be increased. A lower concentration of unreacted monomer will decrease the "stickiness" of the polymer crumb and make transfer of the polymer easier.

We claim:

1. A process comprising introducing a mixture into a mechanically agitated bed of hot polymer particles; wherein said mixture comprises a liquid and a polymer not substantially dissolved in said liquid; and wherein said mixture is a latex produced in an emulsion polymerization process.

2. A process in accordance with claim 1 wherein said bed is mechanically agitated in a manner sufficient to effect evaporation of a substantial portion of said liquid.

3. A process in accordance with claim 1 wherein at least some of said polymer particles are derived from the polymer in said mixture.

4. A process in accordance with claim 1 wherein said bed is positioned within a horizontally oriented cylindrical vessel.

5. A process in accordance with claim 4 wherein polymer particles pass from said vessel to a stripper column wherein a second bed of polymer particles is mechanically agitated.

6. A process in accordance with claim 1 wherein a hot gas is passed through said bed.

7. A process in accordance with claim 1 wherein said mixture is extruded into said bed.

8. A process in accordance with claim 1 wherein said mixture is sprayed into said bed.

9. A process in accordance with claim 1 wherein the temperature of said bed is above about the boiling point of said liquid and below the temperature at which significant thermal degradation of said polymer in said mixture will occur.

10. A process in accordance with claim 1 wherein at least one filler is introduced into said bed.

11. A process in accordance with claim 10 wherein said at least one filler is introduced into said bed separate from said mixture.

12. A process in accordance with claim 10 wherein said at least one filler and said mixture are combined and then introduced into said bed.

13. A process in accordance with claim 12 wherein said at least one filler and said mixture are combined to form a paste which is then introduced into said bed.

14. A process as recited in claim 10 wherein said at least one filler is at least one member selected from the group consisting of
silica,
sand,
calcium carbonate,
clay,
hydrated aluminum silicate,
magnesium silicate,
kaolin,
feldspar,
mica,
aluminum hydroxide,
ZnO,
ZnS,
$TiO_2$,
$BaSO_4$,
barytes,
asbestos,
cotton,
jute,
wood,
nylon,
wool, and
glass.

15. A process as recited in claim 10 wherein said at least one filler is at least one member selected from the group consisting of carbon black, amorphous graphite and crystalline graphite.

16. A process as recited in claim 10 wherein said at least one filler is another polymer.

17. A process in accordance with claim 1 wherein said polymer is at least partially derived from a vinyl compound monomer.

18. A process in accordance with claim 17 wherein said vinyl compound monomer is selected from
vinyl chloride,
vinyl acetate,
styrene,
methyl methacrylate, and
acrylonitrile.

* * * * *